Figure 1:
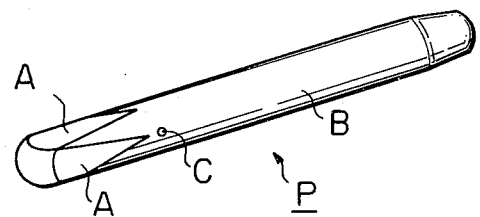

United States Patent [19]

Matsushima

[11] 4,080,089
[45] Mar. 21, 1978

[54] AUTOMATIC DRILLING MACHINE

[75] Inventor: Koji Matsushima, Hamamatsu, Japan

[73] Assignee: Nippon Gakki Seizo Kabushiki Kaisha, Japan

[21] Appl. No.: 536,361

[22] Filed: Dec. 26, 1974

[30] Foreign Application Priority Data

| Nov. 28, 1974 | Japan | 49-135844 |
|---|---|---|
| Nov. 29, 1974 | Japan | 49-143438[U] |
| Nov. 29, 1974 | Japan | 49-143439[U] |
| Nov. 29, 1974 | Japan | 49-136264 |
| Nov. 29, 1974 | Japan | 49-143440[U] |

[51] Int. Cl.² .................................. B27C 9/00
[52] U.S. Cl. .................................. 408/2; 408/10; 408/40; 408/70
[58] Field of Search .......... 408/2, 10, 12, 46, 70, 408/38, 40, 8, 15, 37; 221/157, 171, 173; 198/283, 286, 257, 258, 345, 394

[56] References Cited

U.S. PATENT DOCUMENTS

| 626,502 | 6/1899 | Neville | 408/70 |
|---|---|---|---|
| 1,897,070 | 2/1933 | Nolan | 198/257 |
| 2,117,376 | 5/1938 | Strayer | 408/70 X |
| 2,806,494 | 9/1957 | Kull | 221/157 X |
| 2,857,788 | 10/1958 | Huhn | 408/70 X |
| 3,064,826 | 11/1962 | Ettinger | 198/257 X |
| 3,292,782 | 12/1966 | Vosika | 221/157 X |

FOREIGN PATENT DOCUMENTS

| 1,199,771 | 7/1970 | United Kingdom | 221/171 |
|---|---|---|---|
| 215,705 | 4/1968 | U.S.S.R. | 198/257 |

Primary Examiner—Francis S. Husar
Assistant Examiner—William R. Briggs
Attorney, Agent, or Firm—Burgess, Ryan and Wayne

[57] ABSTRACT

Successively supplied rod materials with one or more flat surfaces such as tuning pins used for pianos are intermittently and periodically forwarded in axial alignment to each other along a prescribed guide path towards a drilling station with axial postures thereof being regulated through rolling and, when required, sliding contacts with machine parts and, drilled transversely preferably by a pair of drills from two opposite sides with difference in timing and stroke without development of metal refuses and, after the drilling operations, the results in the drilling operation are preferably inspected in mechanical or photoelectrical manner in order to stop the entire machine running when any failure in the drilling operation is detected, all the recited operations being carried out fully automatically.

20 Claims, 32 Drawing Figures

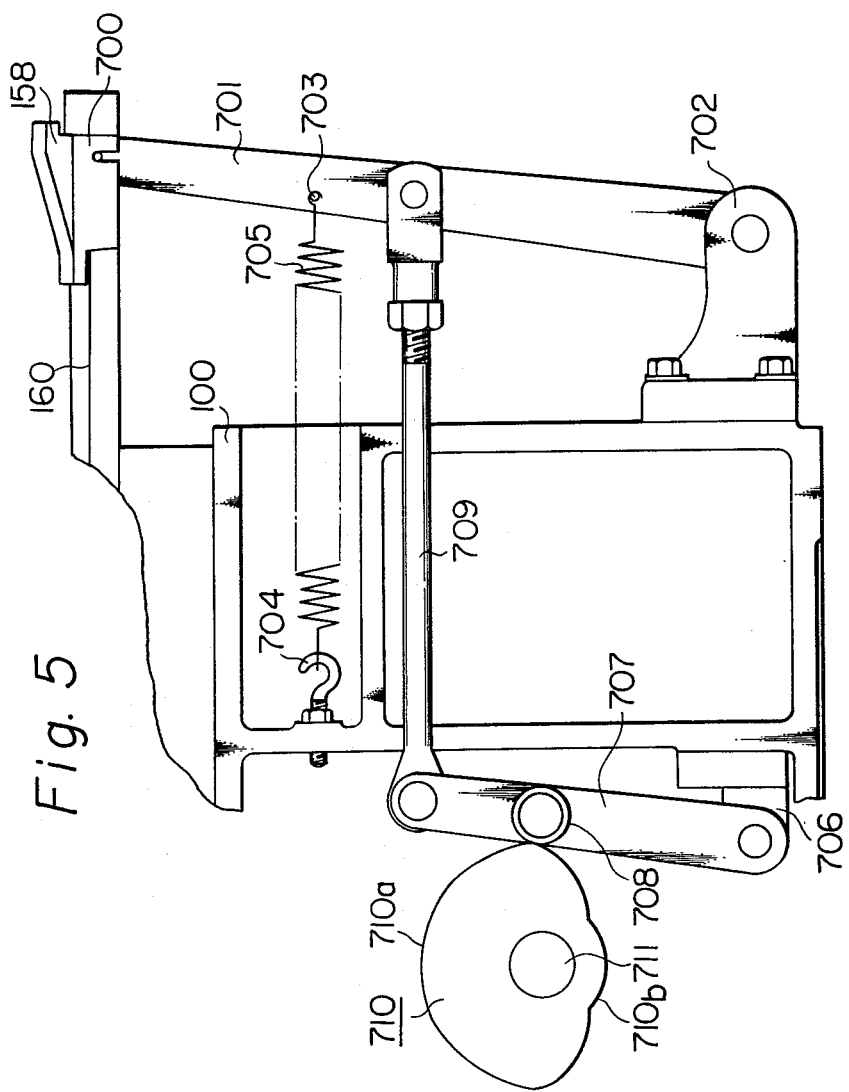

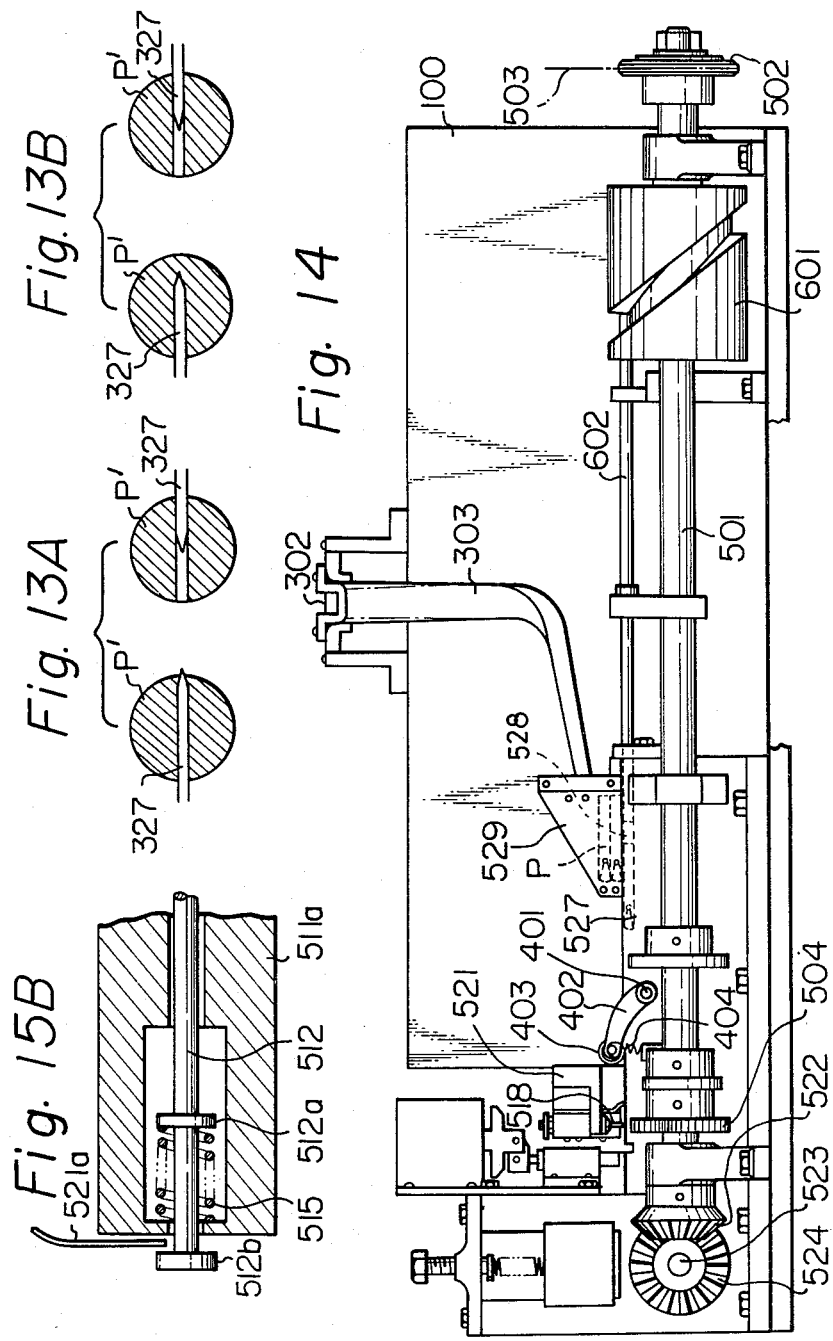

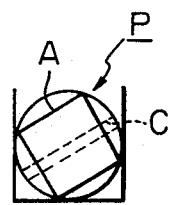 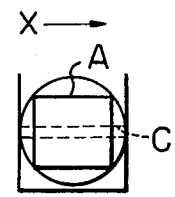 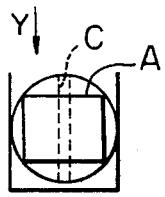
Fig. 17A  Fig. 17B  Fig. 17C
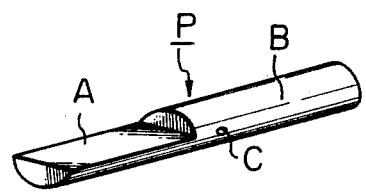
Fig. 18
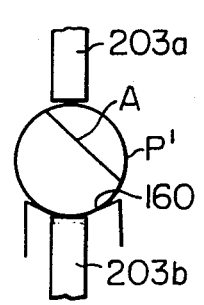 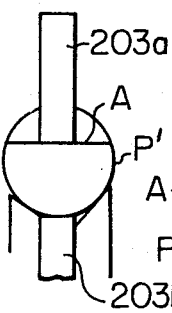 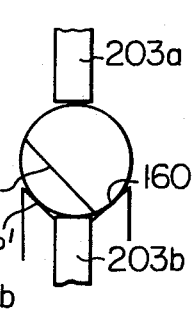 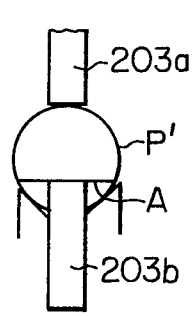
Fig. 19A  Fig. 19B  Fig. 19C  Fig. 19E

AUTOMATIC DRILLING MACHINE

The present invention relates to method for automatically drilling through holes across rod materials and an automatic drilling machine, and more particularly relates to a method and a machine for drilling diametral through holes in a fully automatic manner into prescribed positions of rod materials having one or more flat surfaces and stems of substantially round cross sections such as tuning pins used for pianos.

Taking tuning pins used for pianos as a typical example of the rod materials to which the present invention can advantageously be applied, it is known that a tuning pin is in general provided with several angled flat surfaces formed on one end periphery thereof and adapted for tuning by a wrench when disposed to a piano block, a stem of substantially round transverse cross section and a diametral through hole formed in the stem near the junction of the stem with the angle surfaces and adapted for hooking a piano wire or wires to be connected to the pin.

Conventionally, drilling of such through holes is in general carried out by hand using such implements as jigs. Such a conventional drilling system requires considerable amount of manual operation and, in addition, the rate of the operation is very low. For example, only six to seven sets of rod materials could be drilled per minute in the conventional system. Further, the quality of the hand works tends to be greatly influenced by degree of expertness of the operators, different manner of operation from operator to operator and mental condition of the operators engaged in the work and this often leads to undesirable fluctuation in the accuracy of the drilling result.

It is the principal object of the present invention to provide a method and machine for drilling diametral through holes across rod materials with one or more flat surfaces in a fully automatic manner.

It is another object of the present invention to provide an automatic method and machine for drilling diametral through holes across rod materials with one or more flat surfaces at a remarkably enhanced rate of operation when compared to the conventional drilling system.

It is a further object of the present invention to provide an automatic method and machine for drilling diametral through holes across rod materials with one or more flat surfaces with a remarkably high accuracy in the drilling result.

It is a further object of the present invention to provide an automatic method and machine for drilling diametral through holes across rod materials with one or more flat surfaces with reduced accidents in the drilling operation such as drill breakages.

It is a further object of the present invention to provide an automatic method and machine for drilling diametral through holes across rod materials with one or more flat surfaces which require no special works for removal of metal refuses after the drilling operation.

It is a further object of the present invention to provide an automatic method and machine for drilling diametral through holes across rod materials with one or more flat surfaces which assure high yield of the acceptable products and omission of additional work conventionally needed for selection of such acceptable products.

According to a basic aspect of the present invention, the rod materials successively supplied in the axial direction from a distributing pipe are provisionally stored in a hopper of a supplying mechanism and are passed one by one onto a guide path located below the hopper by a rotary feeder with their axial directions in the provisionally stored disposition being retained. A forwarding mechanism is provided on the upstream side of the guide path which forwards the rod materials along the guide path intermittently and periodically in such a manner that an antecedent rod material is pushed forwardly by its subsequent rod materials. An axial posture regulating mechanism is provided on the downstream side of the forwarding mechanism in order to regulate the axial postures of the rod materials by rolling and, when desired, sliding contact with them to a prescribed one suited for the next drilling operation. The rod materials with the regulated axial posture are then passed to a drilling station with their longitudinal position in the station being fixed through abutment against a stopper. Drilling is applied to the rod material in the drilling station by a pair of drills from two opposite sides with difference in timing and stroke. After the drilling operation, the abutment is cancelled and the rod members are discharged off the drilling station towards the downstream inspecting station at which the result of the drilling operation is inspected in mechanical or photo-electric manner. When any failure in the drilling operation is detected by this inspection, the running of the entire machine is automatically stopped.

Figure 2:
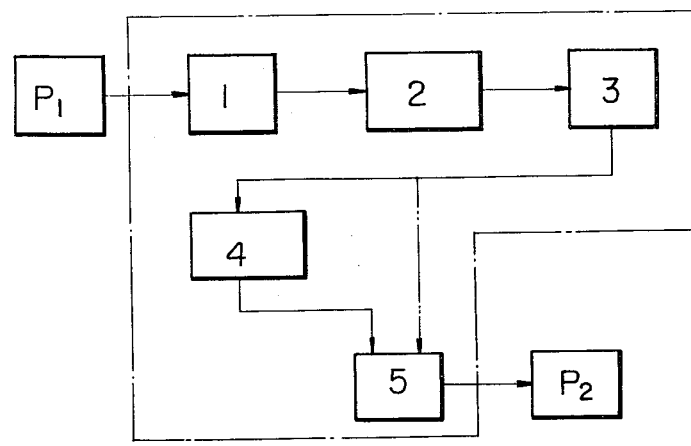
Figure 3:
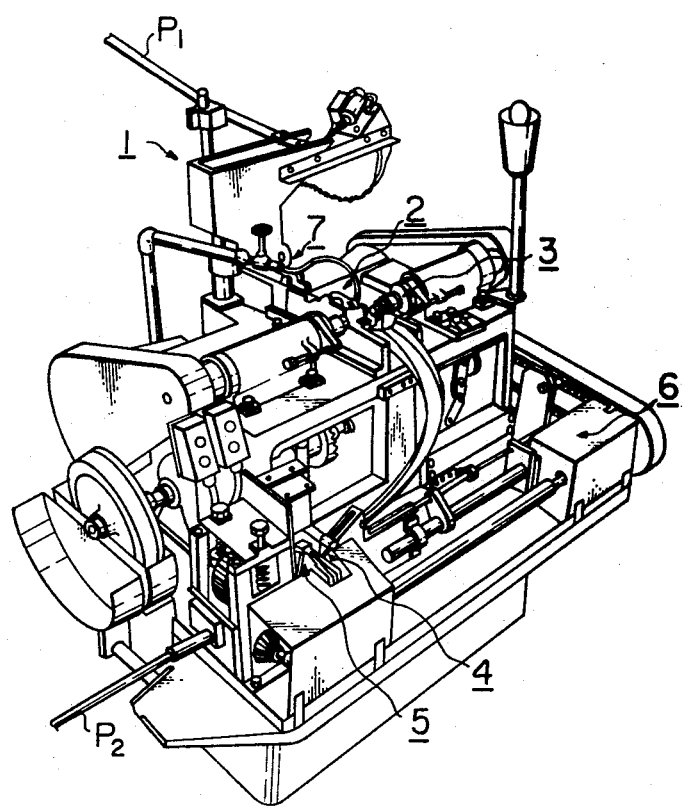
Figure 4A:
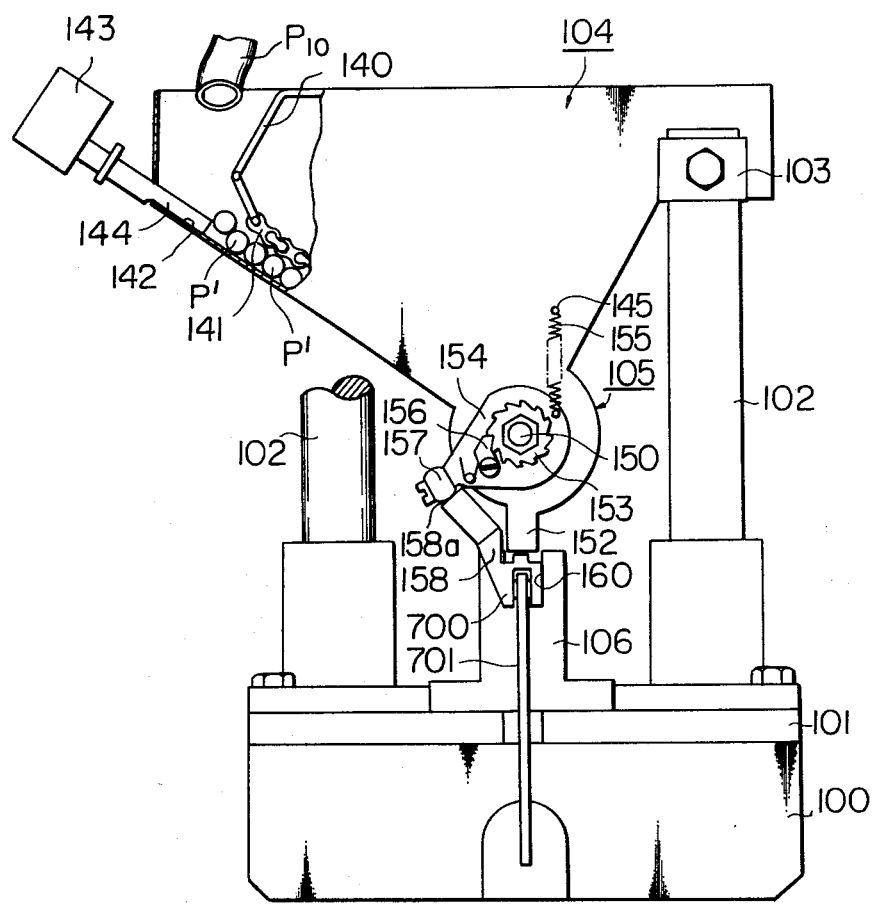
Figure 4B:
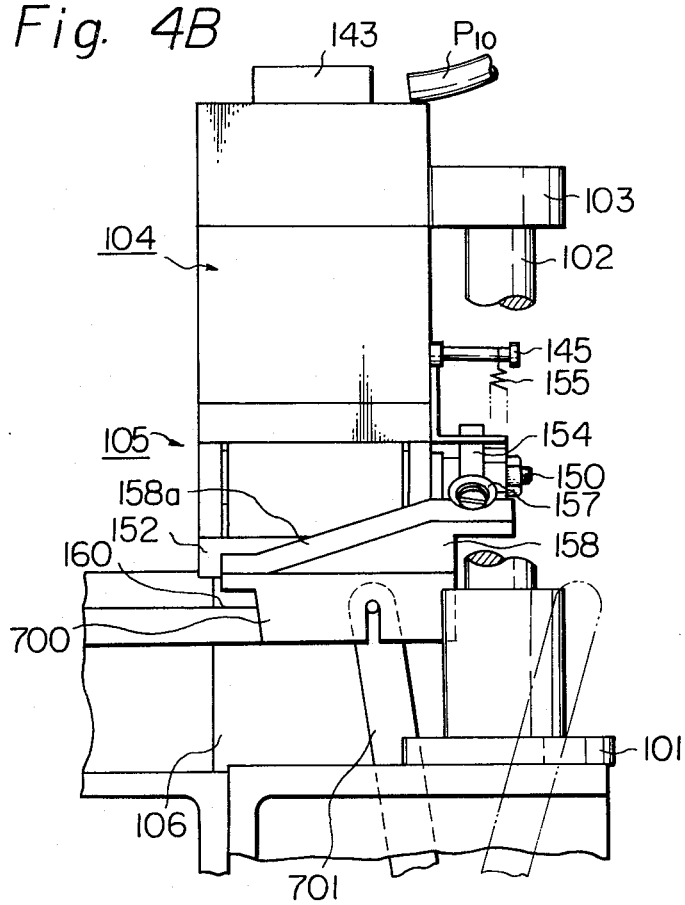
Figure 4C:
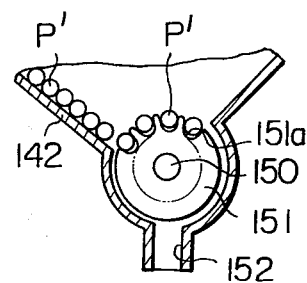
Figure 6:
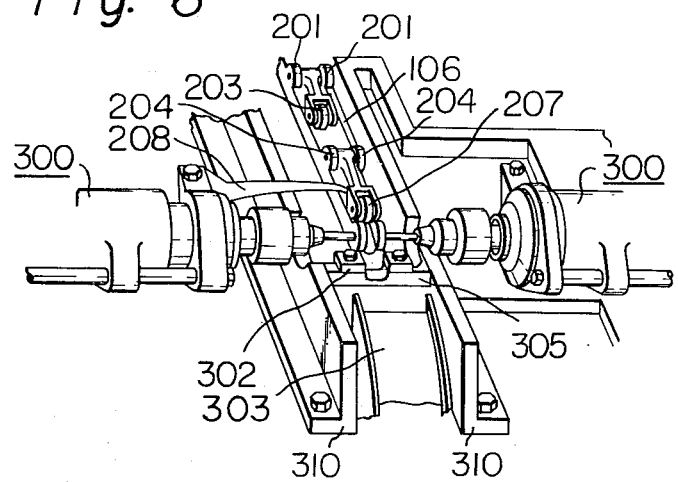
Figure 10:
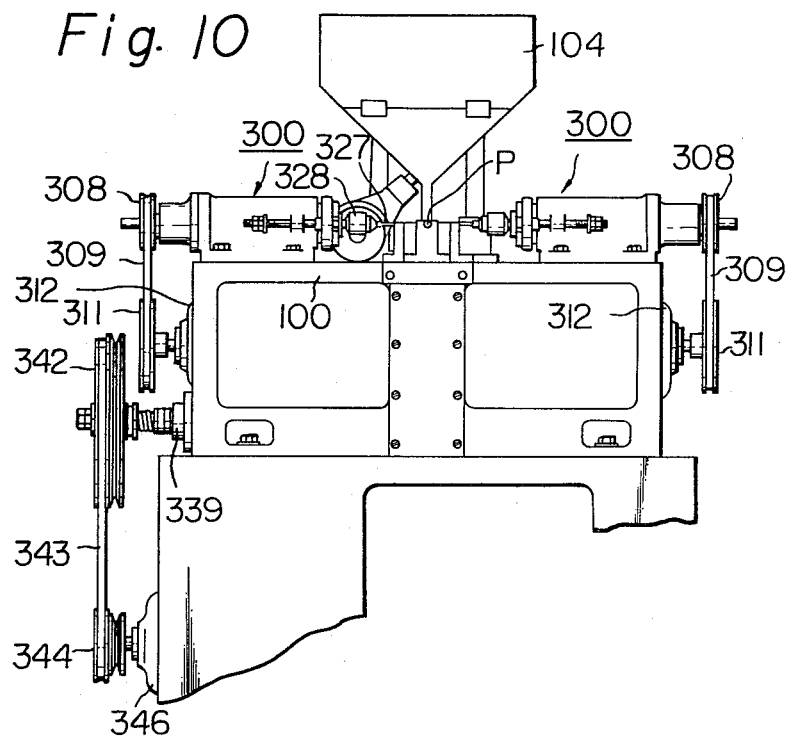
Figure 7:
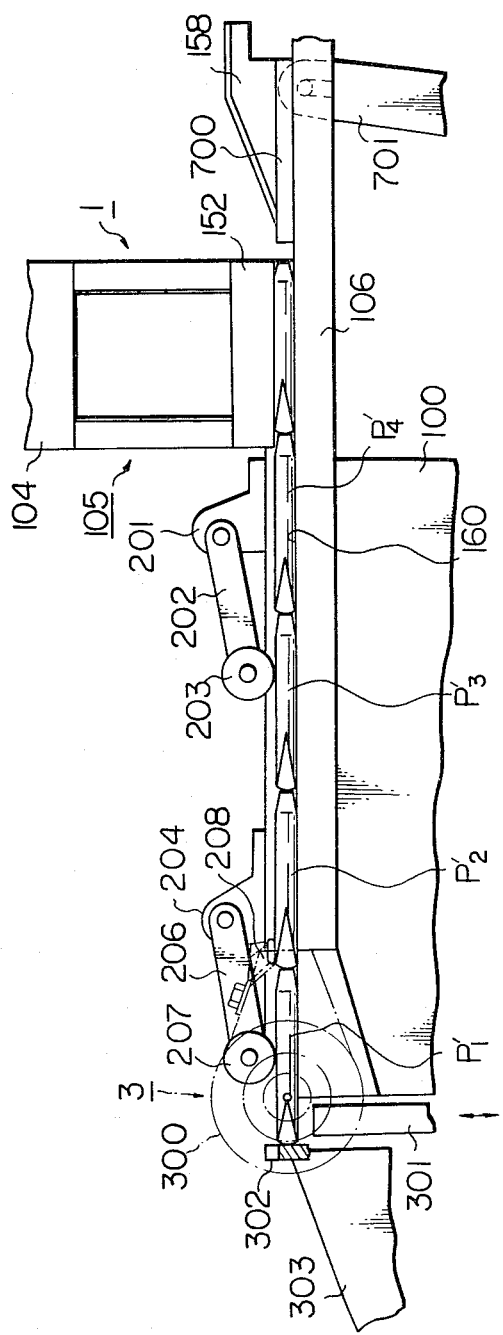
Figure 11:
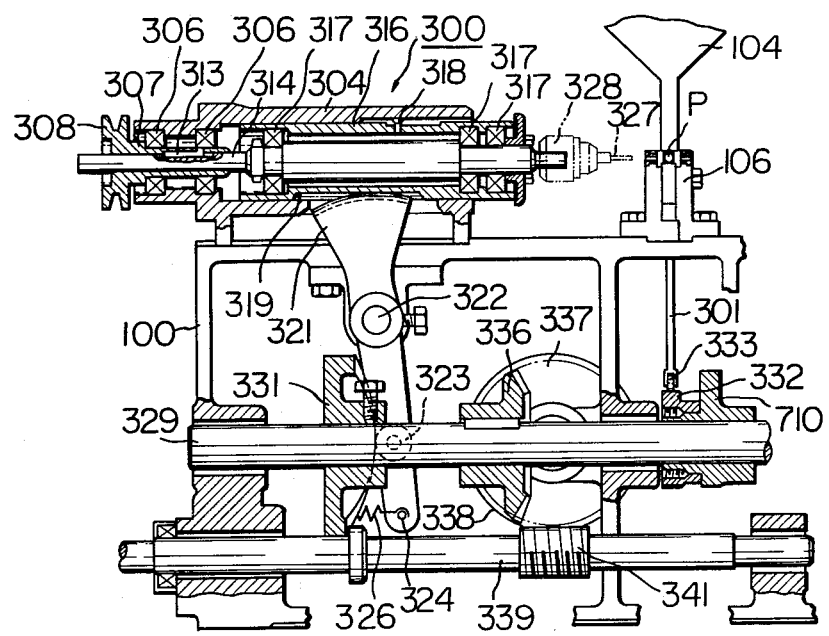
Figure 12:
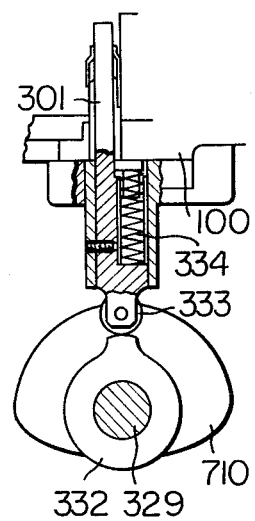
Figure 15A:
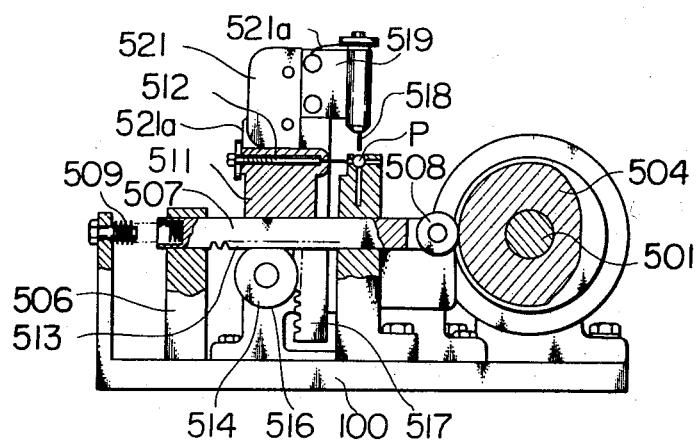
Figure 16:
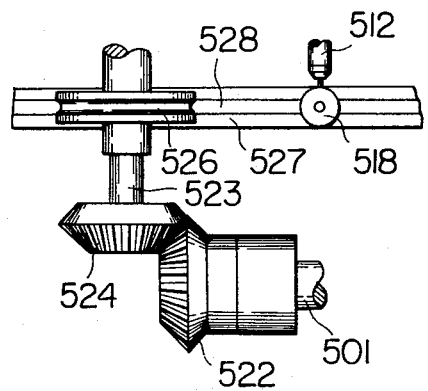

Further features and advantages of the present invention will be made clearer from the ensuing description, reference being made to embodiments shown in the accompanying drawings, in which;

FIG. 1 is a perspective plan view of an example of the rod members produced according to the present invention, FIG. 2 is a block diagram showing the process sequence according to the present invention, FIG. 3 is a perspective view of one embodiment of the automatic drilling machine according to the present invention, FIG. 4A is a back plan view of the supplying mechanism used in the machine shown in FIG. 3, FIG. 4B is a side plan view of the supplying mechanism shown in FIG. 4A, FIG. 4C is a back sectional plan view of the main part of the supply mechanism shown in FIG. 4A, FIG. 5 is a side plan view of the driving part of the supplying mechanism shown in FIG. 4A, FIG. 6 is a perspective plan view of the drilling mechanism used in the machine shown in FIG. 3, FIG. 7 is a side plan view of the first axial posture regulating and drilling mechanisms used in the machine shown in FIG. 3, FIGS. 8A through 8C are explanatory sketches for showing the axial posture regulating action by the regulating rollers used in the regulating mechanism shown in FIG. 7, FIGS. 9A through 9C are explanatory sketches for showing the axial posture regulating action by the regulating slider used in the regulating mechanism shown in FIG. 7, FIG. 10 is a front plan view of the drilling mechanism used in the machine shown in FIG. 3, FIG. 11 is a side plan view, partly in section, of a part of the drilling mechanism shown in FIG. 10, FIG. 12 is a front plan view, partly in section, of the lifting rod and its related parts used in the drilling mechanism shown in FIG. 10, FIGS. 13A and 13B are explanatory sketches for showing two types of drilling actions by the drilling mechanism shown in FIG. 10, FIG. 14 is a side plan view of the second forwarding, second axial posture regulating and inspecting mechanisms used in the machine shown in FIG. 3, FIG. 15A is a front plan view, partly in section, of the inspecting mechanism shown in FIG. 14, FIG. 15B is a front plan view, partly in section, of the inspecting pin and its related parts used in the inspecting mechanism shown in FIG. 14, FIG. 16 is a fragmentary top plan view of the inspecting mechanism shown in FIG. 14, FIGS. 17A through 17C are explanatory sketches for showing an example of the inspecting principle, FIG. 18 is a perspective plan view of another example of the rod members produced according to the present invention, and FIGS. 19A through 19D are explanatory sketches for showing different type of axial posture regulating action.

Referring to FIG. 1, a tuning pin used for piano is illustrated as a typical example of the rod member with at least one angled surface which should be manufactured by the system of the present invention. The rod member P is provided with angled flat surfaces A at a position just close to its front end, a stem B of a substantially round transverse cross sectional profile and a through hole C formed transversely of the stem B at a position whereat the angled flat surfaces merge into the peripheral surface of the stem B. The angled surfaces A are used for turning of the pin when the pin should be inserted into a given supporting block on the piano whereas the through hole C is used for hooking of the piano wire to be connected to the pin. The piano tuning pin usually has four right-angled flat surfaces as shown in FIG. 1.

However, it should be well understood that the products manufactured by the system of the present invention are not limited to such tuning pins used for piano. The system of the present invention is applicable to production of various types of rod members having one or more sets of flat surfaces on its peripheral surface at least at a longitudinal position thereof. A further detailed explanation will be made later regarding another example of the rod member with at least one angled surface.

In the system of the present invention, drilling of the above-mentioned through holes C at prescribed positions is applied to the rod materials without such through holes which are supplied one by one continually and intermittently and, after completion of the drilling operation, the rod members so bored are discharged from the boring station one by one continually and intermittently.

In FIGS. 2 and 3, the rod materials P' are supplied continuously from a given rod material distributor (not shown) to the automatic drilling machine according to the present invention, which is shown with chain-and-dot lines in FIG. 2, via a distributing pipe mechanism P1.

The distributing pipe mechanism P1 includes a distributing pipe as its major element, the curvatures of which are so designed that the rod materials can be processed through the pipe very smoothly. The inner diameter of the pipe is so selected as not to bar the smooth passage of the rod materials through the pipe and, during the passage, an antecedent rod material is forced to move forwardly in the axial direction being pushed by its subsequent rod material.

The rod materials P' so distributed are in the first place passed to a supply mechanism 1, wherein the rod materials P' are provisionally stored and, thereafter, supplied one by one onto a guide path provided below the storage while being separated from the storage. This supply onto the guide path is carried out utilizing gravity operating on the respective rod materials P' and the axial direction of a rod material P' in the stored state is retained when it rests on the guide path too.

The rod material P' so placed on the guide path is now forced to move downstream in an intermittent fashion along the guide path being pushed periodically by a forwarding mechanism 7 provided close to the upstream terminal of the guide path. During this transportation along the guide path, an antecedent rod material is pushed forwardly (downstreamly) by its subsequent rod material. That is, the group of the rod materials P' advancing along the guide path are in axial alignment and in head-to-tail contact to each other, respectively. In this connection, the direction of the transportation along the guide path, i.e. the axial direction of the rod material P' on the guide path, is substantially perpendicular to the later described drilling direction of the rod materials P'.

The rod materials P' so advanced continually and intermittently along the guide path are then passed to the axial posture regulating mechanism 2 located on the downstream side along the guide path. This axial posture regulating mechanism 2 includes one or more sets of pressor members which are urged by suitable spring mechanisms or the like into a rolling or sliding contact with one of the angled surfaces A of the rod material P', thereby the posture of the rod material about its own axis is regulated and registered at the prescribed disposition suited for the later described drilling operation.

With this regulated axial posture being retained, the rod materials P' are then passed to a downstream drilling mechanism 3 in the next cycle of the intermittent travel along the guide path. The longitudinal position of the rod material in the drilling station is fixed through abutment of its head against a stopper provided in the drilling mechanism 3. Drilling operation is carried out from both sides of the rod material in a direction substantially at right angle to the axial direction of the rod material in such a manner that the first drilling action is practiced from one side of the rod material over a stroke fully traversing the diameter of the rod material and the second drilling action is practiced from the other side of the rod material over a stroke shorter than that of the first drilling action. The axial posture of the rod material regulated in the preceding stage of the process is still retained during this drilling operation by a pressor member substantially similar to those used in the axial posture regulating mechanism 2.

After completion of the drilling operation, the rod member P is released from the axial posture regulated state, discharged from the drilling mechanism 3 being pushed by the subsequent rod material P' in the next cycle of the transportation and falls along a tilting chute onto the second guide path.

The rod member P so placed on the second guide path is then forwarded along the path being pushed intermittently and periodically into the axial direction thereof by the second forwarding mechanism 6 provided upstreamly of the second guide path terminal. During this transportation along the second guide path, an antecedent rod member P is pushed by its subsequent rod member P in axial alignment to each other along the path.

Next the rod members P are passed to the second axial posture regulating mechanism 4 located at a downstream position along the guide path and the postures of the rod members P about their axes are regulated in the manner same as the one employed in the first axial posture regulating operation. Here, the axial postures of the rod members are registered at a prescribed disposition suited for the next-staged inspecting operation.

With this regulated axial posture being retained, the rod member P is then passed, in the next cycle of the transportation, to a downstream inspecting mechanism 5 for inspection of the success in the drilling operation. This inspection is practiced by a pair of such mechanical inspecting means as inspecting pins or such electric inspecting means as photo-electric cells in directions perpendicular to each other within a plane including the diameter of the rod member P to be inspected, preferably in the vertical and horizontal directions. When negative answers are obtained re the both directions, that is when the drilling operation applied to that rod member P could not be practiced successfully due to such an accident as drill breakage, a signal is generated by this inspecting mechanism 5 in order to stop the running of the entire drilling machine parts.

In order to obviate malfunction of this inspecting mechanism 5 due to erroneous signals possibly caused by the presence of dust or drill chips on the photo-electric cell or cells, it is preferred to employ mechanical inspecting means such as the inspecting pins.

After completion of the inspecting operation, the acceptable rod members, i.e. rod members to which the drilling operation has been applied successfully, are passed to a collecting pipe mechanism P2 having a collecting pipe as its major element, an antecedent rod member being pushed forwardly by its subsequent rod member.

Similar to the distributing pipe used for the distributing mechanism P1, the collecting pipe of this collecting mechanism has curvatures which is suited for smooth passage of the rod members P through the pipe. During this travel, the rod members in the collecting pipe are in axial alignment and in head-to-tail contact to each other, an antecedent rod member being pushed forwardly by its subsequent rod member in a continual and intermittent fashion.

While the drilled rod members P are passed to the inspecting mechanism 5 from the drilling mechanism 3 passing through the second axial posture regulating mechanism 4 in the above-described embodiment of the present invention, the second axial posture regulating mechanism 4 may be omitted in order to simplify the operation. In this case, the tilting chute connecting the drilling mechanism 3 to the second guide path is omitted too and the drilled rod member is passed in the next cycle of the transportation to an inspecting mechanism 5 located just downstreamly of the drilling mechanism 3. Such a modified process is illustrated in FIG. 1 with two-dot chain lines.

Next, further detail explanations will be made to the constructions and functions of the elements 1 through 7 incorporated in the automatic drilling machine of the present invention shown in FIGS. 2 and 3.

(1) Supply and Forwarding Mechanisms

In the above-described automatic drilling machine, these mechanisms separate the rod materials from their associated storage, which is formed of multiple rod materials continuously issued by the distributing pipe or the like connected upstreamly to the given distributing machine, and forward them one by one periodically to the drilling station via the axial posture regulating station. Further explanation will be made in reference to the embodiments shown in FIGS. 4A through 4C and 5.

As shown in FIGS. 4A and 4B, a plurality of upright supporting poles 102 are fixedly mounted on a base 101 secured to the upper surface of the machine framework 100 in order to carry, at their upper ends, an upwardly diverged material hopper 104 via respective brackets 103. The bottom of the hopper 104 merges into a rotary feeder 105 located above a guide block 106 fixed on the framework 100.

The distributing pipe P10 of the distributing mechanism P1 terminates at the upper opening of the hopper 104 in order to supply the rod materials P' into the interior of the hopper 104. Hanger rods 140 are fixed to the inner walls of the hopper 104 and each of the hanger rods 140 carries a chain 141 pin-joined to its end and the other end of the chain 141 is left free. Therefore, the chains 141 hang down on the rod materials P' resting on the inclined bottom wall 142 of the hopper 104 in order to restrain undesirable shaking of the rod materials P' within the hopper 104.

A solenoid 143 is mounted on the material hopper 104 at a position just below the supply mouth of the distributing pipe P10 of the rod materials P' and a pushing rod 144 operated thereby periodically pushes the rod materials P' falling down from the supply mouth of the distributing pipe P10 in order to prevent occurrence of rod materials clogging around this position.

The rotary feeder 105 is of a cylindrical construction and, as shown in FIG. 4C, a rotor 151 having a plurality of peripheral pockets 151a is fixedly mounted onto a rotary shaft 150 which is journalled at both ends in the end walls of the rotary feeder 105, each of the pockets 151a accommodating one material rod P'.

A chute 152 is annexed to the bottom part of the rotor 151 in order to guide the rod materials P' falling down one by one from the pockets 151a of the rotor 151 as the latter rotates about its axis.

On the outside of the rotary feeder 105 a ratchet 153 is fixedly mounted to the above-described rotary shaft 150 and a cam follower arm 154 is idly mounted to the rotary shaft 150, too. This cam follower arm 154 is urged into counterclockwise rotation in the drawing by a spring 155 one end of which is held by a pin 145 fixed to a side wall of the material hopper 104 and a spring-loaded pawl 156 is pivoted at its one end to the side surface of the cam follower arm 154 and engages at its the other end with a tooth of the above-described ratchet 153 in order to bar the counterclockwise rotation of the latter.

The cam follower arm 154 rotatively carries at its free end a cam follower roller 157 which is urged by the above-described spring 155 into a pressure contact with a plate cam 158. As shown in FIG. 4B, the plate cam 158 has a slope 158a on its upper side and is formed at its bottom in one body with a rod material pushing member 700.

The rod material pushing member 700 reciprocates in the axial direction of the rod materials P' in the guide block 106 in such a manner that, in its forward disposition, it pushes the tail end of the rod material P, which has just fallen down from the rotary feeder 105 onto a guide path formed in the guide block 106, towards the next staged axial posture regulating mechanism 2.

The reciprocal movement of the plate cam 158 and the pushing member 700 is effectuated by the swinging of a swing lever 701, the driving mechanism of which is shown in FIG. 5.

As shown in the drawing, the swing lever 701 is pivoted at its bottom end at a bracket 702 fixed to the machine framework 100 and is urged for counterclockwise turning about the pivot by a spring 705 which engages at its one end with a stud 703 affixed to the stem of the lever 701 and at its the other end with a fixed hook 704. Separately from this, is a cam follower arm 707 pivoted at its bottom end to a bracket 706 affixed to the machine framework 100 and a cam follower roller 708 is rotatably disposed to the stem of the cam follower arm 707. The cam follower arm 707 is at its top end to a connecting arm 709 which is at the other end pivoted to the stem of the above-described swing lever 701. Thanks to this linked mechanism, the cam follower roller 708 is kept in resilient pressure contact with a cam 710 by the above-described spring 705, the cam 710 being fixedly mounted to a cam shaft 711 and comprised of a large diametral portion 710a and a small diametral portion 710b. This cam 710 performs one revolution per one cycle transportation of the rod materials P'.

The rod material supply and forwarding operation is carried out by the mechanism of the above-described construction in the following procedure.

The rod materials P' supplied from the distributing pipe P10 into the hopper 104 rest in order on the inclined bottom wall 142 of the hopper with their axes being parallel to each other. Occurrence of clogging and jumping of the rod materials are successfully prevented by cooperation of the chain 141 and the pushing rod 144.

As the cam 710 shown in FIG. 5 rotates, the small diametral portion 710b comes in contact with the cam follower roller 708, the cam follower arm 707 and, via the connecting arm 709, the swing lever 701 swing leftwardly in the drawing and the pushing member 700 assumes the position shown with solid lines in FIG. 4B in order to forward the materials PI over one pitch along the guide path 160 provided below the chute 152.

Concurrently with this, the cam follower roller 157 ascends along the slope 158a of the plate cam 158 and the cam follower arm 154 rotates in the clockwise direction in FIG. 4A together with the ratchet 153 and the rotary shaft 150 via the pawl 156. Due to this rotation of the rotary shaft 150, the rotor 151 shown in FIG. 4C rotates in the clockwise direction in the drawing over an angular distance corresponding to one set of pocket 151a in order to scoop one rod material P' on the hopper bottom wall 142 and, simultaneously, to pass one rod material P' accommodated in its pocket 151a to the chute 152. Possible counterclockwise rotation of the rotary shaft 150 is barred by the engagement of the ratchet 153 with the pawl 156.

As the cam 710 further rotates, the cam follower roller 708 comes in contact with the large diametral portion 710a of the cam 710, the cam follower arm 707 and the lever 701 swing rightwardly in FIG. 5 and the pushing member 700 moves rightwardly in FIG. 5 and the pushing member 700 moves rightwardly in FIG. 4B so as to allow the rod material P' in the chute 152 to fall onto the guide path 160.

Concurrently with this receding movement of the pushing member 700, the cam follower roller 157 descends along the slope 158a of the plate cam 158, the cam follower arm 154 rotates counterclockwisely in FIG. 4A and the pawl 151 comes into engagement with the next tooth of the ratchet 153 in order to complete one cycle operation.

(2) Axial Posture Regulating Mechanism

In this mechanism regulation of axial postures of the rod materials to a prescribed one is carried out in advance to the next-staged drilling operation, the rod materials being forwarded along the guide path by the forwarding mechanism while assuming random axial postures. The construction of this mechanism is shown in detail in FIGS. 6 through 9.

In FIGS. 6 and 7, the guide block 106 horizontally fixed on the machine framework 100 confines the guide path 160 of the rod materials P' extending from the supply mechanism 1 to the drilling mechanism 3.

At a position somewhat downstream of the supply mechanism 1 along the guide path 160 a pair of brackets 201 are fixed on the guide block 106 on both sides of the guide path 160. The brackets 201 swingably carry an arm 202 which rotatably carries the first posture regulating roller 203 at its free end. This first posture regulating roller 203 is always urged downwardly by a suitable spring (now shown) annexed to the arm 202. The position of this first posture regulating roller 203 is so selected that the same should be in pressure contact with a rod material P'$_3$ which is at a position upstream of the rod material P'$_1$ in the drilling station by two.

At a position further downstream of the first axial posture regulating roller 203 are a pair of brackets 204 fixed on the upper surface of the guide block 106 on both sides of the guide path and the brackets 204 carry an arm 206 swingably, which carries the second axial posture regulating roller 207 rotatably at its free end. This second axial posture roller 207 is always urged downwardly by a suitable spring (not shown) annexed to the arm 206. The position of this second axial posture regulating roller 207 is so selected that the same should be in pressure contact with a rod material P'$_1$ in the drilling position.

An axial posture regulating slider 208 is mounted to the main body of one of a pair of drilling assemblies 300 of the drilling mechanism 3 in such an arrangement that its longitudinal direction crosses the direction of the above-described guide path 160. This axial posture regulating slider 208 is given in the form of an elongated plate which is somewhat flexible and moves across the guide path 160 following the advancing and receding movements of the one drilling assembly 300 for the drilling operation in order to contact at its front end with the upper surface of a rod material P'$_2$ which is at a position upstream of the rod material P'$_1$ in the drilling station by one.

Following the one cycle swinging of the swing lever 701 the plate cam 158 reciprocates once in the direction of the guide path 160 and, thereby, the rotary feeder 105 rotates over one pitch angle so that a rod material P' in the hopper 104 falls on the guide path 160 via the chute 152.

Upon the next cycle swinging of the swing lever 701, the pushing member 700 in one body with the above-described plate cam 158 advances in the direction of the guide path 160 and the rod material P' already placed on the guide path 160 is forwarded downwardly along the guide path 160. As a result of this advancement, the rod material P'$_4$ comes into a rolling pressure contact with the first axial posture regulating roller 203 and the rod material P'$_4$ turns about its axis as the front angled surface A tends to follow the periphery of the posture regulating roller 203, thereby the surface of the rod material to be drilled is registered at the prescribed position.

Concurrently with this, the antecedent rod material P'$_3$ is released from the pressure contact with the posture regulating roller 203 being pushed forwardly over one pitch by the subsequent rod material P'$_4$ and comes to a position assumed by the rod material P'$_2$ in FIG. 7. The rod material P'$_2$ then comes to the drilling position, i.e. the position assumed by the rod material P'$_1$ in FIG. 7, and into a rolling pressure contact with the second axial posture regulating roller 207. Meanwhile the front end of the rod member P$_1$ after the drilling is somewhat raised by a lifting rod 301 driven by a suitable cam arrangement so as to be released from the abutment against a stopper 302 disposed to a bracket 305 and the rod member P$_1$ is then discharged onto a chute 303.

At the timing of the drilling operation, the drilling assemblies 300 move forwardly in order to drill a through hole C in the prescribed position of the rod material P'$_2$ which is kept in the correct axial posture by the second axial posture regulating roller 207. Following this forward movement of one of the drilling assemblies 300, the axial posture regulating slider 208 advances and comes into a sliding contact with the upper surface of the rod material P'$_3$ in order to regulate the axial posture of the latter.

Next, the mechanism of the axial posture regulating action by the regulating roller 203 or 207 will be explained in more detail in reference to FIGS. 8A through 8C, which are seen in the advancing direction of the rod materials P'. In the illustration, the two-dot-chain lines shown the direction along which the through hole C should be drilled transversely of the rod material P'.

Figure 8A:
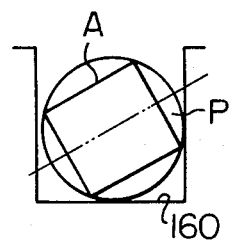

In case the rod material P' is passed to the posture regulating station with the direction along which the through hole C should be drilled being inclined against the surface of the guide path 160 as shown in FIG. 8A, i.e. the upper angled surface A of the rod material P' being inclined against the horizontal direction, the regulating roller 203 comes into a rolling contact with the upper angled surface A from upper side. Then, as the regulating roller 203 is urged downwardly by the spring annexed to the pivot as explained above, this downwardly urging force generates a corresponding moment about the center axis of the rod material P' and the rod material P' turns about the center axis thereof as shown in FIG. 8B. As the turning goes on further, the rod material P' assumes the disposition shown in FIG. 8C in which the upper angled surface A of the rod material P' comes into an almost full contact with the lower periphery of the regulating roller 203 and the direction along which the through hole C should be drilled becomes almost horizontal, i.e. the axial posture of the rod material P' is regulated as prescribed.

Next, explanation will be made to the mechanism of the axial posture regulating action by the axial posture regulating slider 208 in reference to FIGS. 9A through 9C, which are seen in the advancing direction of the rod materials. The two-dot-chain lines show the direction along which the through hole C should be drilled transversely of the rod material P'.

Figure 9A:
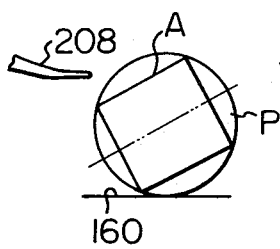

In case the rod material P' is passed to the axial posture regulating station with the direction along which the through hole C should be drilled being inclined against the surface A of the guide path 160 as shown in FIG. 9A, i.e. the upper angled surface A of the rod material P' being inclined against the horizontal direction, the front end of the axial posture regulating slider 208 comes into a sliding contact with the upper angled surface A of the rod material P' as the drilling assembly moves towards the rod material P'.

Figure 9B:
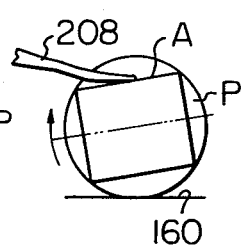
Figure 9C:
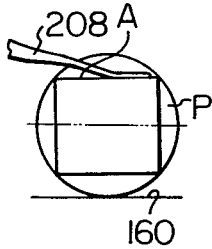

As a result of this sliding contact, the horizontal force exerted on the upper angled surface A generates a corresponding moment about the center axis of the rod material P' and the rod material P' is forced to turn about its axis as shown in FIG. 9B. As the turning goes on further, the end of the regulating slider 208 fully contacts the upper angled surface A of the rod material P' and the direction along which the through hole C should be drilled becomes almost horizontal, i.e. the axial posture of the rod material P' is regulated as prescribed.

(3) Drilling Mechanism

This mechanism functions so as to drill through holes C into the prescribed positions of rod materials with angled surfaces which are passed to the drilling station while keeping the regulating axial posture and further detailed explanation will be made thereto in reference to FIGS. 6 and 10 through 12 as follows.

As shown roughly in FIG. 6, the rod materials, the axial postures of which are regulated as prescribed by the axial posture regulating rollers 203, 207 and the axial posture regulating slider 208 of the axial posture regulating mechanism 2, are passed to the prescribed drilling station along the guide block 106 while its longitudinal position being fixed through abutment of its head against the stopper 302 and, after completion of the prescribed drilling by the pair of drilling assemblies 300, are raised from the drilling station by the lifting rod 301 shown in FIG. 11 so that they are discharged onto the chute 303 being released from the abutment against the stopper 302 and pushed forwardly by the subsequent rod materials P'.

During this drilling operation, the pair of drilling assemblies 300 perform, in addition to their axial rotations, axial reciprocations of different timings of the starting and of different lengths of the stroke. The lifting rod 301 performs up-and-down reciprocation in order to release the rod member P from the abutment against the stopper 302 at a timing when the both drilling assemblies 300 start their receding movements. The arrangement for driving such complicatedly combined movements of the drilling mechanism 3 is shown in FIGS. 10 through 12.

Although the drilling assembly 300 on the left side when seen from the discharging side of the rod members P is shown in FIG. 11, the right side drilling assembly 300 is of substantially similar construction and function, too.

The main body 304 having a horizontal axis crossing the advancing direction of the rod members P is fixed to the machine framework 100 and rotatably carries a driving tubular shaft 307 via bearings 306. This tubular shaft 307 is provided on the outside of the main body 304 with a pulley 308 in one body therewith and is operationally connected to a rotation driving motor 312

(FIG. 10) via a belt 309 and a pulley 311 of the motor 312.

In the area between the two sets of bearings 306 the tubular shaft 307 engages a main shaft 314 via a sliding key 313 and, therefore, the main shaft 314 is forced to rotate as the tubular shaft 307 rotates although it is allowed to move in the axial direction relative to the tubular shaft 307.

An inner tube 316 is inserted into the above-described main body 304 and carries the main shaft 314 rotatably at two longitudinal positions of the latter via bearings 317. This inner tube 316 further engages the main body 304 via a sliding pin 318. Therefore, the main shaft 314 can rotate independently of the inner tube 316 although it cannot move into the axial direction relative to the inner tube 316. Further, the inner tube 316 can move into the axial direction relative to the main body 304 although it cannot rotate independently of the main body 304.

A rack 319 formed on the bottom surface of the inner tube 316 meshes with a sector gear 321 which is pivoted at the middle of its stem to a pin 322 fixed to the machine framework 100 and provided at the midway of its lower extension with a rotary cam follower roller 323. A coil spring 326 is provided with the one end thereof being fixed to the machine framework and the other end thereof locking on a pin 324 fixed to the bottom end of the lower extension of the sector gear 312. Due to this spring arrangement, the sector gear 321 is always urged for a clockwise turning in the drawing.

As shown with chain-and-dot lines in the drawing, a holder 328 of a drill 327 is detachably mounted to the front end of the main shaft 314 in the usual manner.

In FIG. 11, an end face cam 331 for the reciprocation of the drilling assembly 300 is securely mounted to a horizontal cam shaft 329 rotatably carried by the machine framework 100 and a cam follower roller 323 is in a rolling pressure contact with the end cam surface of the cam 331 being urged by the spring 326 connected to the lower extension of the sector gear 321. As already explained, the pair of drill assemblies 300 are different from each other in their timings of the reciprocations and their lengths of the reciprocation strokes and these differences can be properly designed by adjusting the diagrams of the end cam surfaces, the dwells and the mounting angles to the cam shaft 329 of the respective cams 331. Further, the cam surfaces of the cams 331 are so designed that the forwarding movement of the drill 327 should be somewhat slower than the receding movement thereof.

As better shown in FIG. 12, the above-described cam shaft 329 is accompanied with a peripheral cam 710 for the forwarding mechanism 7 and with a peripheral cam 332 which are both securely mounted thereto. The lifting rod 301 is in engagement with the peripheral cam 332 via a cam follower roller 333 rotatably disposed to the lower end thereof and a spring 334 is provided in order to keep the roller 333 in pressure contact with the periphery of the cam 332.

Separately from these cam arrangements, a bevel gear 336 is fixedly mounted to the cam shaft 329 in meshing engagement with another bevel gear 337 and a gear 338 formed in one body with the bevel gear 337 is in meshing engagement with a worm 341 securely mounted to a main drive shaft 339. As better seen in FIG. 10, this main drive shaft 339 is operably connected to a cam drive motor 346 fixed to a suitable position of the machine framework 100 via a pulley 342 secured to the shaft 339, a pulley 344 secured to the rotary shaft of the motor 346 and a belt 343 running between the two pulleys 342 and 344.

Further, as clearly shown in FIG. 6, the above-described brackets 201, 204 for the axial posture regulating rollers 203, 207, the bracket 305 for the stopper 302 and the guide block 106 for the guide path 160 are all mounted to brackets 310 fixed to the upper surface of the machine framework 100.

As already explained, the foremost rod material P' is passed to the drilling station along the guide path 160 defined by the guide block 106 with its axial posture being retained in the regulated disposition. Then, by the rotation of the end face cam 331, the sector gear 321 is rendered to turn clockwisely in FIG. 11 about the fixed pin 322 and the inner tube 316 advances towards the rod material P' in the position together with the drilling assembly main shaft 314 due to the pinion (sector gear) rack arrangement.

As the main shaft 314 is driven for rotation by the driving motor 312 (FIG. 10) too, the drill 327 advances while rotating in order to drill the through hole C in the rod material P' from right side in the drawing. The stroke of this forward movement of the drill 327 and its related parts is so designed that the front end of the drill 327 passes diametrally fully across the body of the rod material P'. Following further rotation of the cam 331, the sector gear 321 now turns counterclockwisely in the drawing about the pin 322, the inner tube 316 together with the main shaft 314 recedes away from the rod member P and the drill 327 escapes out of the through hole C drilled in the rod member P.

At this very timing, the opposite side drilling assembly 300 starts its operation and the drill 327 drills the rod member P from the right side in the drawing. However, this additional drilling operation by the opposite side drilling assembly 300 is intended for removal of metal refuses developed on the periphery of the through hole C due to the foregoing drilling action by the left side drilling assembly and, therefore, the stroke of this additional drilling operation is designed as somewhat shorter than the full length of the through hole C.

A further explanation will be made as to the above-described drilling operation in reference to FIGS. 13A and 13B. In the case of FIG. 13A, the drill 327 drills a hole into the rod material P' from left side to such an extent that its point projects slightly beyond the right side periphery of the rod material P'. Then, as a small guide hole is formed on the right side periphery of the material P', the right side drill 327 advances being guided by this small hole till about the midway of the hole already drilled by the left side drill 327 for removal of the metal refuses developed on the periphery of the hole. It is not alway necessary to make the left side drill advance to the above-described extent. For example, in the case of FIG. 13B, the left side drill 327 advances till a position somewhat beyond of the center of the material P' whereas the right side drill advances to such an extent that its stroke somewhat overlaps that of the left side drill 327. Anyway, one of the drills 327 should not advance fully through the rod material P' as it may cause undesirable development of metal refuses after the drilling operation.

At the timing when the both drilling operations are completed, the lifting rod 301 is moved upwardly by the peripheral cam 332 in order to raise the front end of the rod member P so that the rod member P should be released from the abutment against the stopper 302 and discharged from the drilling station onto the chute 303 shown in FIG. 6 being pushed by the subsequent rod materials P' in the next cycle of the transportation (forwarding operation). After the rod member P has been completely discharged out of the drilling station, the lifting rod 301 is lowered by the spring 334 (FIG. 12) in order to resume the original stand-by disposition.

(4) Inspecting Mechanism

This mechanism functions to inspect the success in the preceding drilling operation and, when any failure in the drilling operation which might be caused by breakage of the drill during the operation is detected, automatically stop the running of the entire machine. Further detailed explanation will be made as follows in reference to FIGS. 14 through 17.

To begin with, explanation will be made to one mechanical principle employed in the inspecting operation by this mechanism, reference being made to FIGS. 17A through 17C. After being passed onto a guide path via the chute 303 the rod member P assumes random axial posture as shown in FIG. 17A. That is, the degree of inclination of the drilled through hole C with respect to the horizontal plane is quite at random. When the rod members P are passed to the inspecting station while retaining such a random axial posture, it is practically impossible to fix the inspecting direction or directions. So, in order to fix the inspecting direction or directions, a later described regulation of the axial posture is applied to the rod member P in advance to the inspection of the drilled result.

After this axial posture regulation, the rod member P may assume either of the two axial postures, i.e. the one shown in FIG. 17B in which the through hole C extends in the horizontal direction (X-direction) and the other shown in FIG. 17C in which the through hole C extends in the vertical direction (Y-direction). Therefore, it is necessary to practice the inspection in two directions, i.e. in the X- and Y-directions, in order to successfully detect the success in the foregoing drilling operation. In case the obtained results are positive for both directions, the rod member P so inspected is judged as acceptable whereas, when either of the obtained results is negative, the rod member P so inspected is judged as unacceptable and the running of the entire machine is automatically stopped.

In FIGS. 14 through 17, a main shaft 501 is rotatably and horizontally mounted to the machine framework 100 in parallel to the cam shaft 329 shown in FIG. 11 and is driven for synchronous rotation with the latter via a sprocket 502 fixed to one end thereof and a chain 503 engaging with the sprocket 502. A later described peripheral cam 504 for reciprocation of the X- and Y-directional inspecting pins is fixedly mounted to this main shaft 501.

In FIG. 15A, a slider 507 slidably supported by a stand 506 fixed on the framework 100 carries at one end thereof a rotary cam follower roller 508 and is accompanied at the other end thereof with a compression spring 509, whose free end abuts a part of the framework 100, so that the roller 508 is always pressed against the periphery of the cam 504.

A block 511 is fixedly mounted on the slider 507, in which a spring-loaded X-directional inspecting pin 512 is accommodated in a longitudinally movable arrangement. The inspecting pin 512 moves longitudinally towards the inspecting position following the same directional movement of the slider 507 under normal condition. However, as the inspecting pin 512 is spring-loaded towards the inspecting position in the block 511 fixedly carried by the slider 507, the same only slides in the block 511 when its smooth movement towards the inspection is barred for any reason and only the block 511 and the slider 507 are allowed to move towards the inspecting position.

A rack 513 is formed in the bottom side of the slider 507 in meshing engagement with a pinion 514 and a further pinion 516 formed in one body with this pinion 514 meshes with a vertical rack 517. This rack 517 is supported by the machine framework in a vertically reciprocal arrangement and, at the top end thereof, carries a spring-loaded Y-directional inspecting pin 518 via a block 519 annexed thereto. Similar to the X-directional inspecting pin 512, this Y-directional inspecting pin 518 is so constructed that, although the same moves vertically following the same directional movement of the vertical rack 517, it only slides in the block 519 and only the rack 517 and the block 519 move downwardly when the downward movement of the former is barred for any reason.

As seen in FIG. 15A, an electric device 521 is attached to the inspecting pins 512 and 518 so that, when movements of both pins 512 and 518 are barred, the barring is sensed by the electric device 521 and a corresponding electric signal is generated, the signal so functioning as to stop the running of the respective drive motors.

An embodiment of the arrangement for generation of the above-described electric signal is shown in FIG. 15B, in which the inspecting pin 512 is accommodated in a bore of a block 511a which is formed in one body with the block 511 and a compression spring 515 is inserted between a flange 512a of the inspecting pin 512 and the end flange of the block 511a. By this spring 515, the inspecting pin 512 is always urged rightwardly in the drawing, i.e. towards the rod member P in position (not shown). So, as far as the rightward movement of the inspecting pin 512 with the block 511 is not barred, the head 512b of the inspecting 512 is kept in contact with a limit switch terminal 512a of the electric device 521. However, when the inspecting pin 512 slides in the bore of the block 511a against the repulsion by the spring 515 due to the failure in the foregoing drilling operation, the head 512b of the inspecting pin 512 disengages the limit switch terminal 521a as shown in the drawing. This disengagement indicates the fact that the drilling operation applied to that rod member has ended in failure. This impulsive change in electric quantity is converted into an electric signal by the electric device 521 in order to stop the running of the entire machine and, when necessary, generate an alarm for the operator.

Returning to FIG. 14 again, a bevel gear 522 is fixedly mounted to one end of the main shaft 501 in a meshing engagement with a bevel gear 524 fixedly mounted to a rotary shaft 523 which horizontally extends in a direction substantially perpendicular to the axial direction of the main shaft 501.

As shown in FIG. 16, a friction roller 526 is fixed to this rotary shaft 523 with its lower periphery confronting a guide path 528 which connects the inspecting station to the collecting pipe mechanism P2 shown in FIG. 3. Upon rotation, this friction roller 526 comes into a rolling frictional contact at its lower periphery with the rod member P after the inspection in order to forward the rod member P towards the next station along the guide path 528 defined by a guide block 527. Further, an upright guide plate assembly 529 is fixed to the upper surface of the guide block 527 in combination with the lower termination of the chute 303 in order to transfer the rod member P after the drilling smoothly from the chute 303 onto the guide path 528 defined by the guide block 527. (see FIG. 14)

The second forwarding mechanism 6 includes a grooved cam drum 601 fixed on the main shaft 501 and a pushing rod 602 which reciprocates in the axial direction being driven by the cam drum 601. Although not clearly shown in the drawing, the pushing rod 602 is so operationally connected to the cam drum 601 as to be driven for reciprocation upon rotation of the cam drum 601. The pushing rod 602 is supported by the machine framework 100 in the axially reciprocal arrangement and the front end of this pushing rod 602 is received in the guide path 528 defined by the guide block 527.

The second axial posture regulating mechanism 4 includes a bent arm 402 pivoted at its one end to a pin 401 disposed to the side surface of the guide block 527 and an axial posture regulating roller 403 rotatably disposed to the other end of the bent arm 402. This regulating roller 403 is urged for a pressure contact with the upper surface of the rod member P in the guide path 528 by a spring 404. By this pressure contact, the axial postures of the rod members P are regulated so as to fit the subsequent inspection following the principal mechanism similar to that by the regulating rollers 203 and 207 of the first axial posture regulating mechanism 2.

After completion of the drilling operation, each of the rod member P is disengaged from the stopper 302 by the lifting rod 701 and discharged from the drilling station at every cycle of the transportation, falls down along the chute 303 and is received on the guide path 528 defined by the guide block 527 at the position of the guide plate assembly 529 in superposed disposition. (see FIG. 14)

By the forward movement of the pushing rod 602 which reciprocates once per each revolution of the main shaft, the rod member P is advanced intermittently and periodically being pushed by the subsequent rod members P and is passed to the inspecting station after the regulation of the axial posture thereof by the regulating roller 403.

At this very moment, the small diametral portion of the peripheral cam 504 comes in contact with the cam follower roller 508 in FIG. 15A, the X-directional inspecting pin 512 moves horizontally towards the rod member P in position following the same directional sliding of the slider 507 whereas the Y-directional inspecting pin 518 is moved downwardly towards the rod member P in position being driven by the slider 507 via the pinion-rack arrangement 514, 516 and 517.

As explained already, barring of movements of the both inspecting pins 512 and 518 indicates the fact that the drilling action applied to that rod member P has ended in failure. In this case, the electric device 521 so functions as to stop running of the all drive motors of the machine, i.e. the running of the entire machine is stopped. On the contrary, either of the inspecting pins 512 and 518 can move without any barring, it indicates the fact that the drilling action applied to that rod member P ended in success. In this case, the electric device 521 does not operate at all and, therefore, the machine continues its normal running.

Although the horizontal and vertical directions are allotted to the X- and Y- inspecting directions in the foregoing example, the directions could be chosen as desired in a plane including any diametral direction of the rod member so far as the both directions are at right angle to each other. Following this choice, it is necessary to adjust the pressing direction by the axial posture regulating roller 403 of the second axial posture regulating mechanism 4 so that, after the regulation, the axial directions of the through holes C drilled in the rod members P should meet any one of the X- and Y-directions.

As already mentioned, in a preferred embodiment of the present invention, the inspecting mechanism 5 could be directly connected to the drilling mechanism 3. In this case, the chute 303, the second forwarding mechanism 4, the second axial posture regulating mechanism 4 and the Y-directional inspecting pin 518 could be omitted. In this case, however, a slight modification need to be applied to the drilling station and its related parts. That is, in order to retain the axial posture of the rod member P once regulated by the first axial posture regulating mechanism 2 in the inspecting station, lifting of the front end of the rod member P after the drilling should be cancelled and, as and alternative to the vertical reciprocation of the lifting rod 301, the stopper 302 and its related parts may be so constructed that the stopper 302 reciprocates vertically being driven by an arrangement like the one shown in FIG. 12. In this case, the stopper 302 is lifted at a timing when it should provide an abutment for the rod material brought into the drilling station in order to fix the longitudinal position of the rod material in the station. Further, the guide path 160 should preferably be extended through the inspecting station via the drilling station, too.

In the case of the direct connection of the inspecting mechanism 5 to the drilling mechanism 3, the axial direction of the through hole C drilled in the rod member P is retained in the inspecting station, too. Therefore, in this case, it is sufficient if the inspection is carried out in the direction same as the drilling direction only. More concretely, the inspection could be carried out in the X-direction (horizontal direction) only.

After completion of the inspection, the rod members P, which have been judged as acceptable, are passed to the subsequent collecting pipe mechanism P2 along the guide path 528 by operation of the friction roller 526 shown in FIG. 16.

Further, whereas the foregoing explanation is focussed upon the example of the rod member having two or more sets of angled flat surfaces, the present invention is applicable to a rod member such as shown in FIG. 18, in which the rod member P has a flat surface A, a stem B of a round cross section and a diametral through hole C formed near the junction of the two parts A and B.

In this case, the axial posture regulating operation is carried in manners such as shown in FIGS. 19A through 19D, in which a pair of upper and lower axial posture regulating rollers 203a and 203b are used in combination with a V-shaped groove portion of the guide path 160, the rollers 203a and 203b being located at positions just over and under the flat surface A of the rod material P' and the stem B of the rod material being received in the V-shaped groove portion of the guide path.

In case the angled flat surface A is inclined on the upper side of the rod material P' as shown in FIG. 19A, the upper side roller 203a comes into a rolling pressure contact with the flat surface A in order to regulate the axial posture of the rod material P' as shown in FIG. 19B.

Whereas, in case the angled flat surface A is inclined on the lower side of the rod material P' as shown in FIG. 19C, the lower side rollers 203b comes into a rolling pressure contact with the flat surface A in order to regulate the axial posture of the rod material P' as shown in FIG. 19D.

Figure 8B:
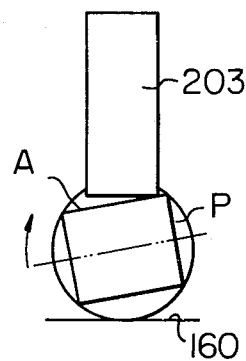
Figure 8C:
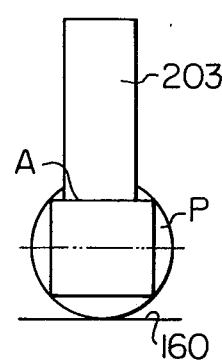

Further, the direction of the through hole C to be drilled in the rod material should not necessarily be at right angle to the side flat surface A of the rod material P' as shown in FIGS. 8A through 8C. For example, in a modified embodiment of the present invention, it is employable that the regulating roller 203 may operate from the upper side and the drilling itself may be carried out in the diagonal direction of the square section formed by the flat surfaces. It is employable also that a pair of the angled flat surfaces may be made oblique to the horizontal, the regulating roller may operate from the upper biased side and the drilling may be carried out in the horizontal direction.

The following advantages can result from employment of the present invention.

(1) Drilling operation on such rod materials with flat surfaces as tuning pins used for pianos can be carried out not only fully automatically, but also at a remarkably high speed. Taking the tuning pins used for pianos, only 6 to 7 pins could be drilled each minute in the case of the conventional manual hand work whereas 18 to 20 pins could be processed each minute when the present invention is employed. In addition, the drilling could be very precisely carried out when compared to that by the conventional manual hand work.

(2) The rod materials successively supplied from the distributing pipe could be separated one by one from their associated storage mass and successfully passed to the drilling station in order.

(3) As the random axial postures assumed by the supplied rod materials are regulated to a prescribed one and the regulated axial posture is retained without any disorder in the drilling station, too, the drilling could be applied to the correct position of the rod materials with enhanced accuracy in the position of the through holes to be drilled.

(4) In addition to the automatized drilling operation, development of metal refuses accompanying the drilling operation is effectively prevented by applying the drilling action to the rod material from both sides thereof. Therefore, no special works are needed after the drilling operation for removal of metal refuses.

(5) As the failures in the drilling operation which may be caused by breakage of drills can be inspected automatically and necessary reactions thereto can be carried out automatically too, the yield of the acceptable products can be remarkably enhanced. In addition no additional work and apparatus are needed for selection of acceptable products from a mass of the products. No dangerous accidents may be caused by the failure in the drilling operation as the entire machine is quite automatically stopped right after such a failure has been detected.

(6) When the electric system annexed to the inspecting pin arrangement is so constructed that a suitable alarm is generated concurrently with the stop of the machine running, the operator can instantly notice the accident and carry out a necessary counteraction or counteractions such as replacement of the broken drill. Therefore, the rate of operation can be surprisingly enhanced.

(7) As the drilling and inspecting operations are carried out making use of the (angled) flat surface or surfaces possessed by the rod materials, high accuracies in such operations can be expected. In order to drill the through holes C in the rod materials, it is not obligatory to make use of such flat surface or surfaces of the rod materials. However, according to the basic concept of the present invention, the presence of such flat surfaces of the rod materials is purposely utilized in order to regulate the axial postures assumed by the rod materials.

I claim:

1. A machine for automatically drilling holes through elongated rods each having one or more flat outer surfaces, said machine comprising:

a pushing member for forwarding said rods seriatim in longitudinal axial alignment to each other to a drilling station along a guide path, said station having a drilling action thereat;

means regulating the longitudinal axial posture of each rod so as to fit the drilling action at said station, said axial posture regulating means comprising a guide defining said guide path for said rods, an axial posture regulating member adjacent said guide, means resiliently urging said regulating member into contact with said flat surface of each rod, exerting substantially tangential pressure on an edge of at least one of said flat outer surfaces of a non-aligned rod until said non-aligned rod becomes aligned and thereafter maintaining substantially uniform pressure on at least two edges of said at least one of said flat outer surfaces, thereby rotating said non-aligned rod to an aligned position and maintaining said rod in said aligned position when the rod is forwarded by said forwarding means; and means for drilling a hole diametrically through each rod in said drilling station, said means for drilling a hole including a pair of drills located on two opposite sides of the rod in said drilling station and oriented substantially perpendicular to the longitudinal axis of said rod, and means driving said pair of drills at mutually different stroke and timing relationships.

2. The machine of claim 1, further comprising means inspecting the success of the drilling action, said inspecting means comprising a first inspecting pin axially reciprocal in the drilling direction and a second inspecting pin axially reciprocal perpendicular to said drilling direction, said pins being both in a common plane perpendicular to the axial direction of said rod materials.

3. The machine of claim 2 comprising a first block mounted to be axially movable in said drilling direction, said first inspecting pin being mounted in said first block, means resiliently urging said first inspecting pin toward a rod member said drilling machine, means reciprocating said first block with said first inspecting pin in said drilling direction, a second block mounted to be movable in a direction perpendicular to said drilling direction, said second inspecting pin being mounted within said second block, whereby said first and second inspecting pins are movable in a common plane, means resiliently urging said second pin toward a rod member in said drilling machine, means reciprocating said second block with said second inspecting pin in said direction perpendicular to said drilling direction, and an electric device affixed to said first and second inspecting pins for providing an electrical signal when movements of both said inspecting pins towards a rod member in said drilling machine are inhibited.

4. The machine of claim 3 wherein said first block reciprocating means comprises a slider slidably supported by the framework of said machine, said first block being fixedly mounted on said slider, a cam follower roller rotatably disposed on one end of said slider, a rotary main shaft, a peripheral cam on said rotary main shaft, and means urging said cam follower roller into resilient pressure contact with said peripheral cam.

5. The machine of claim 4, wherein said electric device comprises two limit switch means mounted to maintain contact with parts of said first and second inspecting pins when said pins are moved toward said rod material, and to break electric contact when movement of said pins is barred.

6. The machine of claim 1, wherein said driving means comprises a main body affixed to the framework of said machine and of substantially cylindrical construction, an inner tube encased within said main body in an axially reciprocal but not rotatable arrangement, means for driving said inner tube for periodic axial reciprocation, a main shaft carrying said drills at a front end thereof an encased within said inner tube in an independently rotatable but not independently reciprocal arrangement, and means for driving said main shaft for axial rotation.

7. The machine of claim 6 further comprising a sliding pin mechanism, said inner tube engaging said main tube by way of said sliding pin mechanism.

8. The machine of claim 7 further comprising a stopper on said guide path downstream of said drilling station, said stopper having an upper surface higher than the bottom surface of said guide path in order to provide an abutment to the front end of a rod material in said drilling station, a lifting rod disposed in said guide path at a position just upstream of said stopper, and means for driving said lifting rod vertical reciprocation in order to release said rod material from abutment against said stopper after completion of a drilling operation.

9. The machine of claim 8 wherein said lifting rod driving means comprises a cam follower roller rotatably disposed on the lower end of said lifting rod, a rotary cam shaft, a peripheral cam fixedly mounted to said rotary cam shaft, and means urging said cam follower roller into resilient pressure contact with said cam.

10. The machine of claim 6, wherein said inner tube driving means comprises a rack on the bottom surface of said inner tube, a sector gear meshing with said rack and pivoted at its apex to a fixed point on said machine framework, a cam follower roller rotatably disposed on a lower extension of said sector gear, and end face cam fixedly mounted to a cam shaft, means urging said cam follower roller into resilient pressure contact with the cam surface of said end face cam, and means driving said cam shaft for rotation.

11. The machine of claim 6, further comprising a sliding key mechanism, said main shaft driving means comprising a driving tubular shaft rotatably encased within said main body and accommodating said main shaft in an independently reciprocal arrangement by way of said sliding key mechanism, and means driving said driving said tubular shaft for rotation.

12. The machine of claim 1 wherein said axial posture regulating means comprises a guide block defining a guide path for said rod materials, at least one bracket on said guide block, an arm pivoted at one end to said bracket, an axial posture regulating roller rotatably disposed on the free end of said arm, and means resiliently urging said regulating roller into contact with side flat surface of said rod materials.

13. The machine of claim 12 wherein said means urging said regulating roller comprises means urging said regulating roller downwardly toward the bottom surface of said guide path.

14. The machine of claim 12 comprising at least a pair of regulating rollers mounted to opposite sides of said guide path whereby said regulating rollers are resiliently urged toward said rod materials and, in the area of said regulating rollers, said guide path has a V-shaped bottom grooved portion.

15. The machine of claim 12 wherein said axial posture regulating means further comprises a mechanical element positioned to slidingly resiliently engage said flat surface in pressure contact when said bottom materials are forwarded along said guide path by said forwarding means.

16. The machine of claim 15 wherein said axial posture regulating means comprises an axial posture regulating slider having one end fixed to a movable part of said drilling machine and another end extending above said guide path to come into sliding engagement with said flat surfaces of said rod material as the latter is forwarded along said guide path.

17. A machine for atuomatically drilling holes through elongated rod materials having one or more flat outer surfaces, comprising:

a pushing member for forwarding said rod materials in longitudinal axial alignment to each other to a drilling station along a guide path said station having a drilling action thereat;

means regulating the longitudinal axial posture of said rod materials so as to fit the drilling action at said station, said axial posture regulating means comprising a guide block defining said guide path for said rod materials, at least one bracket on said guide block, an arm pivoted at one end to said bracket, an axial posture regulating roller rotatably disposed on the free end of said arm, means resiliently urging said regulating roller into contact with said flat surface of said rod materials, a stopper disposed in said guide path at a downstream end of said drilling station with its upper surface in the raised state higher than the bottom surface of said guide path in order to provide an abutment to the front end of said rod materials in said drilling station, and means driving said stopper for vertical reciprocation; and means for drilling a hole diametrically through the rod material in said drilling station, said means for drilling a hole including a pair of drills located on two opposite sides of said rod material in said drilling station, the axial direction of which is substantially perpendicular to the longitudinal axial direction of said rod material, and means driving said pair of drills for the drilling action at mutually different stroke and timing relationships, said driving means comprising a main body affixed to the framework of said machine and of substantially cylindrical construction, an inner tube encased within said main body in an axially reciprocal but not rotatable arrangement, means for driving said inner tube for periodic axial reciprocation, a main shaft carrying said drills at a front end thereof and encased within said inner tube in an independently rotatable but not independently reciprocal arrangement, and means driving said main shaft for axial rotation.

18. The machine of claim 17 wherein said stopper driving means comprises a cam follower roller rotatably disposed on the lower end of said stopper, a rotary cam shaft, a peripheral cam fixedly mounted on said rotary cam shaft, and means urging said cam follower roller into resilient pressure contact with said cam.

19. In a machine for automatically drilling holes through rod materials having one or more flat outer surfaces comprising a pushing member for forwarding said rod materials in longitudinal axial alignment to each other to a drilling station along a guide path, a guide defining at least a portion of said guide path, and an axial posture regulating member regulating the axial posture of said rod materials so as to fit the drilling action and means for drilling a hole diametrically through a rod material in said drilling station; the improvement wherein said drilling means includes a pair of drills located on two opposite sides of a rod material in said drilling station, the axial direction of which is substantially perpendicular to the axial direction of said rod material, and control means including a reciprocating mechanism driving said pair of drills for the drilling action at different stroke and timing from each other.

20. In a machine for automatically drilling holes through rod materials having one or more flat outer surfaces comprising a pushing member for forwarding said rod materials to a drilling station along a guide path, a guide defining at least a portion of said guide path, and an axial posture regulating member regulating the longitudinal axial posture of said rod materials so as to fit the drilling action, means drilling a hole diametrically through a rod material in said drilling station, and means inspecting the success of the drilling action; the improvement wherein said inspecting means includes a first inspecting pin axially reciprocal in the drilling direction and a second inspecting pin axially reciprocal perpendicular to said drilling direction, and respective means to axially reciprocate said first and second inspecting pins said pins being both in a common plane perpendicular to the axial direction of said rod materials.

* * * * *

UNITED STATES PATENT OFFICE
CERTIFICATE OF CORRECTION

Patent No. 4,080,089　　　　　Dated March 21, 1978

Inventor(s) Koji Matsushima

It is certified that error appears in the above-identified patent and that said Letters Patent are hereby corrected as shown below:

Column 18, line 57: Before "said" insert --in--.

Column 19, line 25: "an" (1st occurrence) should be --and--.

line 39: Delete "for"; before "vertical" insert --for--.

Column 20, line 19: "bottom" should be --rod--.

line 29: "atuomatically" should be --automatically--.

Signed and Sealed this

Seventeenth Day of October 1978

[SEAL]

Attest:

RUTH C. MASON
Attesting Officer

DONALD W. BANNER
Commissioner of Patents and Trademarks